US 11,352,929 B2

(12) United States Patent
Sofan

(10) Patent No.: US 11,352,929 B2
(45) Date of Patent: Jun. 7, 2022

(54) CATALYTIC CONVERTER FOR AN INTERNAL COMBUSTION ENGINE AND METHOD FOR OPERATING A CATALYTIC CONVERTER

(71) Applicant: Dr. Ing. h.c. F. Porsche Aktiengesellschaft, Stuttgart (DE)

(72) Inventor: Uli Sofan, Esslingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 97 days.

(21) Appl. No.: 16/784,142

(22) Filed: Feb. 6, 2020

(65) Prior Publication Data

US 2020/0248601 A1 Aug. 6, 2020

(30) Foreign Application Priority Data

Feb. 6, 2019 (DE) .................... 10 2019 102 897.3

(51) Int. Cl.
*F01N 3/28* (2006.01)
*F01N 3/021* (2006.01)
*B01D 53/94* (2006.01)

(52) U.S. Cl.
CPC ......... *F01N 3/2889* (2013.01); *F01N 3/2892* (2013.01); *B01D 53/9495* (2013.01); *F01N 3/0218* (2013.01); *F01N 2240/02* (2013.01); *F01N 2240/36* (2013.01); *F01N 2410/00* (2013.01); *F01N 2470/24* (2013.01)

(58) Field of Classification Search
CPC .... F01N 3/0205; F01N 3/2889; F01N 3/2892; F01N 2240/02; F01N 2240/36; F01N 2470/12; F01N 2470/24
See application file for complete search history.

(56) References Cited

U.S. PATENT DOCUMENTS

| 5,130,099 A | 7/1992 | Schatz | |
|---|---|---|---|
| 6,178,744 B1 | 1/2001 | Perset | |
| 2014/0165558 A1* | 6/2014 | Birgler | F28D 7/0066 60/605.1 |
| 2014/0208725 A1* | 7/2014 | Schweizer | F28F 21/00 60/320 |

(Continued)

FOREIGN PATENT DOCUMENTS

| DE | 39 18 596 | 12/1990 |
|---|---|---|
| DE | 198 17 342 | 11/1998 |

(Continued)

OTHER PUBLICATIONS

Machine translation of JP 2018-105216 A, accessed Sep. 28, 2021. (Year: 2021).*

(Continued)

*Primary Examiner* — Jonathan R Matthias
(74) *Attorney, Agent, or Firm* — Gerald E. Hespos; Michael J. Porco; Matthew T. Hespos

(57) ABSTRACT

A catalytic converter for an internal combustion engine has a housing (2) and a catalyst element (12) formed in the housing (2). The housing (2) is formed such that exhaust gas of the internal combustion engine can flow through the housing (2). The catalyst element (12) is formed such that fluid can flow around and through it. Additionally, the catalyst element (12) has a plurality of ribs (15) on its surface (14) that faces the exhaust gas.

10 Claims, 3 Drawing Sheets

(56) References Cited

U.S. PATENT DOCUMENTS

2018/0230884 A1* 8/2018 Kawaguchi ............... F01N 3/24

FOREIGN PATENT DOCUMENTS

| DE | 198 57 509 | | 7/1999 | | |
|----|------------|---|--------|---|---|
| DE | 199 51 583 | | 5/2001 | | |
| EP | 0 556 568 | | 8/1993 | | |
| JP | 2018105216 A | * | 7/2018 | ......... | F28D 21/0003 |
| WO | 99/20876 | | 4/1999 | | |

OTHER PUBLICATIONS

Machine translation of EP 0556568 A1, accessed Sep. 28, 2021. (Year: 2021).*
German Office Action dated Jan. 17, 2020.

* cited by examiner

CATALYTIC CONVERTER FOR AN INTERNAL COMBUSTION ENGINE AND METHOD FOR OPERATING A CATALYTIC CONVERTER

CROSS REFERENCE TO RELATED APPLICATION

This application claims priority under 35 USC 119 to German Patent Appl. No. 10 2019 102 897.3 filed on Feb. 6, 2019, the entire disclosure of which is incorporated herein by reference.

BACKGROUND

Field of the Invention

The invention relates to a catalytic converter for an internal combustion engine and to a method for operating a catalytic converter.

Related Art

Catalytic converters for purifying exhaust gases of an internal combustion engine, are known. Catalytic converters function to ensure compliance with motor vehicle exhaust gas emissions prescribed by law and are contained in the internal combustion engine in an exhaust gas aftertreatment unit that is arranged in the exhaust line of the internal combustion engine. The components associated with the exhaust gas aftertreatment unit, such as a particulate filter and the catalytic converter, should reach their light-off temperature, which corresponds to a minimum operating temperature necessary for exhaust gas purification, of the corresponding component, as quickly as possible after cold-starting to ensure exhaust gas aftertreatment that is effective and as complete as possible.

Engine-internal measures and/or engine-external measures have been used so that exhaust that flowing out of the internal combustion engine after cold-starting can bring the component rapidly to its minimum operating temperature. The engine-internal measures having included using oxygen-rich mixture combustion and blowing secondary air into the exhaust gas stream upstream of the catalytic converter. The engine-external measures have included the use of electrically heatable elements in the exhaust gas stream upstream of the corresponding component, warming up the exhaust gas stream as it flows through and transfer the heat to the component for bring the component to a temperature corresponding to the minimum operating temperature that allows purification by the corresponding component. Usually, no aftertreatment of the exhaust gases takes place below the minimum operating temperature of the component.

DE 39 18 596 A1 discloses a catalytic converter for an internal combustion engine that has an associated upstream heat exchanger. The exhaust gas of the internal combustion engine can be warmed up in the heat exchanger. Fluid flows through the heat exchanger at low temperatures of the exhaust gas. The heat exchanger at least partially has a catalytic-oxidation coating.

DE 198 57 509 A1 discloses a heat exchanger that functions to lower the temperature of the exhaust gas flowing through the heat exchanger and where the exhaust gas was catalytically treated upstream of the heat exchanger.

WO 99/20876 A1 discloses a catalytic converter with a heat exchanger arranged upstream of the catalytic converter. The heat exchanger is designed in the form of a ribbed pipe.

The object of the present invention is to provide an improved catalytic converter. A further object of the present invention is to specify a method for operating a catalytic converter.

SUMMARY

The invention relates to a catalytic converter for an internal combustion engine. The catalytic converter has a housing and a catalyst element in the housing. The housing is formed such that exhaust gas of the internal combustion engine can flow through the housing. According to the invention, the catalyst element is formed such that fluid can flow around and through the housing, and is formed such that the catalyst element has ribs on its surface that faces the exhaust gas. Thus, fluid flows through the housing for purifying exhaust gas as well as around the catalyst element externally and through said catalyst element internally. The advantage of fluid flowing through the catalyst element on both sides is that, in addition to the exhaust gas, a further fluid can act on the catalyst element, as a result of which the catalytic function of the catalyst element can be increased.

The flow of hot fluid through the catalyst element internally increases the catalytic effect of the catalyst element, provided that the catalyst element has a catalytic layer, in particular the catalytic layer of the catalyst element formed such that catalytic layer faces the exhaust gas and is applied to an active surface of the catalyst element. The catalyst element is embodied such that fluid can flow around and through it. Additionally, it is possible to guide the exhaust gas through the catalyst element and to allow the fluid that is provided for warming up or heating and for cooling, to flow around the catalyst element. The flow of fluid through and around the catalyst element can be selected depending on the available installation space for the catalytic converter and/or a maximum exhaust gas flow. Therefore, the catalytic converter advantageously is designed for cooling and for warming up or heating. The warming up serves generally for the exhaust gas, whereas the cooling serves for protecting the catalytic effect and any catalytic layer that is applied. An active surface of the catalytic converter can be increased in a simple manner with the aid of the large number of ribs, as a result of which the cooling or heating function of the catalyst element, and therefore its catalytic effect, is substantially improved.

The catalyst element may be formed such that it can be circumvented with the aid of a pipe in the housing and through which fluid can flow. The catalyst element may be arranged in an annular channel formed between the housing and a pipe accommodated in the housing and through which fluid can flow. Therefore, it is possible, in a simple manner, for exhaust gas to flow around the catalyst element at specific operating points and for the exhaust gas to pass through the pipe, without flowing around or through the catalyst element, at other operating points.

In a further refinement, the catalyst element is formed in a helical manner. This provides the advantage of creating an enlarged active surface of the catalyst element without increasing a longitudinal extent of the catalytic converter. The catalyst element may wind around the pipe so that an increase in size of the active surface is brought about with the same installation space requirement.

For the purpose of secured positioning of the catalyst element, the pipe and/or the housing have/has latching elevations on their/its surface which faces the catalyst element. These latching elevations may be arranged in a helical manner, provided that the catalyst element is likewise embodied in a helical manner. Thus, the catalyst element is positioned in the annular channel in an axially secured manner between the latching elevations.

The flow of fluid through the catalyst element in the direction of the longitudinal axis can be regulated with the aid of a regulating element. Therefore, the exhaust gas can act on, partially act on or completely or virtually completely circumvent the catalyst element depending on the operating point.

The regulating element may be a disk that can be pivoted about its center axis. Thus, there is a low flow resistance together with simple construction of the regulating element when a flow cross section, which can be closed by the regulating element, is completely open. It should be noted that hot exhaust gas flows around the regulating element, as a result of which warping of the regulating element and/or jamming is possible in the case of a complex construction. This can be avoided by way of the proposed simple construction. The regulating element is preferably embodied in a similar manner to a throttle valve.

A flow of fluid through the catalyst element in the direction of its element axis can be regulated, so that fluid can also flow through the catalyst element depending on the operating point.

The catalyst element may be a ribbed pipe.

The pipe of the catalytic converter may have an inlet opening through which fluid can flow in an axial manner and an outlet opening through which fluid can flow in an axial manner. Additionally, recesses through which fluid can flow in a radial manner may be formed downstream of the inlet opening and upstream of a regulating element that opens and closes a flow cross section of the pipe. Therefore, a simple construction of the pipe is provided for circumventing the catalyst element. More particularly, when the flow cross section is closed by the regulating element, the exhaust gas can flow into the annular channel that comprises the pipe and in which the catalyst element is arranged. This flow is via the recesses through which fluid can flow in a radial manner.

Accordingly, the exhaust gas flowing out of the annular channel after being acted on by the catalyst element can flow into the outlet opening via further recesses downstream of the regulating element and upstream of the outlet opening and through which fluid can flow. Thus, the catalytic converter has a simple cylindrical construction of the pipe and a simple construction of the housing.

To increase the catalytic effect, the catalyst element has a catalytic coating on its active surface.

A second aspect of the invention relates to a method for operating a catalytic converter, such as the above-described catalytic converter. The method comprises causing a hot fluid to flow through the catalyst element in the case of a cold exhaust gas stream, and causing a cold fluid to flow through the catalyst element in the case of a hot exhaust gas stream. In certain embodiments, the method further comprises causing a hot fluid to flow around the catalyst element in the case of a cold exhaust gas stream, and causing a cold fluid to flows around the catalyst element in the case of a hot exhaust gas stream.

With the method according to the invention, the exhaust gas can be effectively warmed up or heated, for the purpose of reducing pollutants, in the relevant operating ranges of the internal combustion engine and the catalyst element can be protected against overheating and therefore damage in other operating ranges of the internal combustion engine.

A flow of hot fluid through the catalyst element advantageously begins at the same time as the internal combustion engine is started, so that a first cold exhaust gas stream can already be purified.

Alternatively, the flow of hot fluid through the catalyst element begins before the internal combustion engine is started, so that improved purification of the first cold exhaust gas stream can be achieved.

Further advantages, features and details of the invention can be found in the following description of preferred exemplary embodiments and using the drawing. The features and combinations of features mentioned above in the description and the features and combinations of features mentioned below in the description of the figures and/or shown in the figures alone can be used not only in the respectively specified combination, but rather also in other combinations or on their own, without departing from the scope of the invention. Identical or functionally identical elements are assigned identical designations. It is possible for reasons of clarity that the elements are not provided with their designation in all figures, but without losing their assignment.

DETAILED DESCRIPTION

Figure 1:
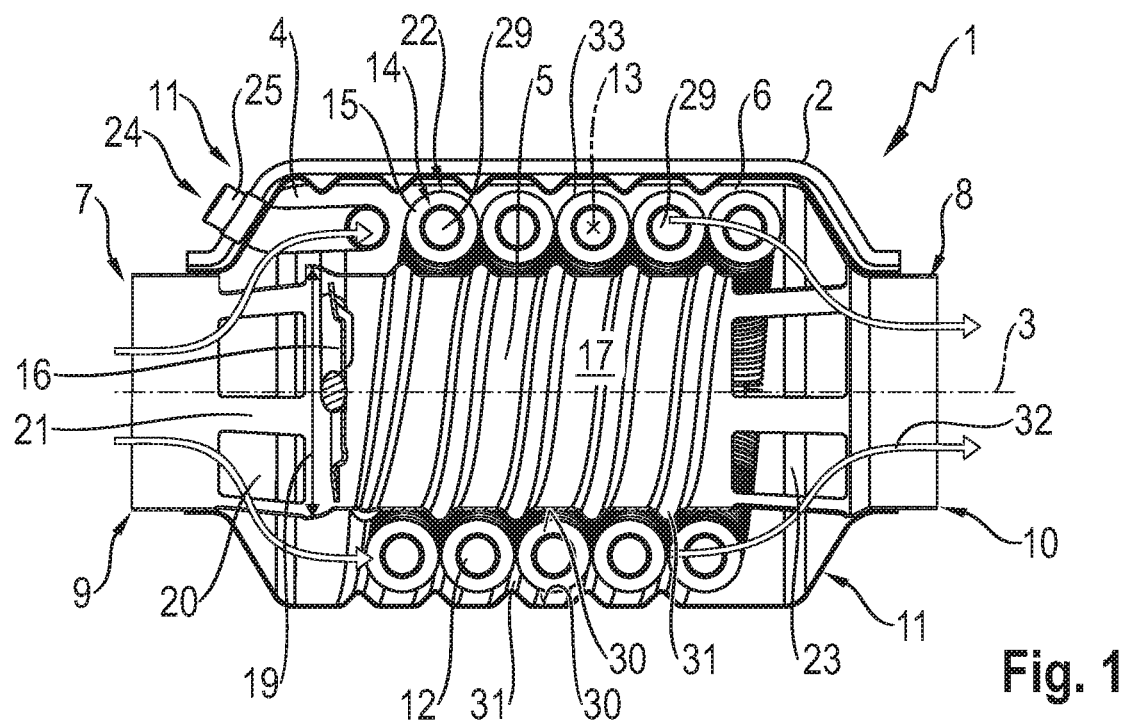
FIG. 1 shows a longitudinal section through a catalytic converter according to the invention in a first operating state.

A catalytic converter 1 according to the invention, illustrated in a first operating state in FIG. 1, has a housing 2 through which fluid can flow. The housing is a hollow cylinder with a longitudinal axis 3. A pipe 5 through which fluid can flow is arranged in a housing interior 4, and an annular channel 6 through which fluid can flow is formed between the pipe 5 and the housing 2. The pipe 5 is coaxial with the housing 2.

The catalytic converter 1 has an inlet opening 7 for the inflow of exhaust gas of an internal combustion engine into the housing 2 and has an outlet opening 8 for the outflow of the exhaust gas that has been treated catalytically. The inlet opening 7 corresponds to a first end 9 of the pipe 5. The outlet opening 8 corresponds to a second end 10 of the pipe 5 that is opposite the first end 9. The housing 2 and the pipe 5 are sealed in relation to the surrounding areas in the regions of the inlet opening 7 and the outlet opening 8. This sealing can be achieved with the aid of a cohesive connection and/or by using a sealing element and/or by a forcefitting connection between the pipe 5 and the housing 2 or other sealing techniques known to those skilled in the exhaust system art.

The pipe 5 is a substantially hollow-cylinder, and the housing 2 has truncated cone-like end regions 11 on a hollow-cylindrical central part between the end regions 11.

A catalyst element 12 through which fluid can flow in the direction of the longitudinal axis 3 and in the direction of its element axis 13 is arranged in the annular channel 6. The catalyst element 12 is embodied in a tubular manner, with the pipe 5 being arranged in a helically winding manner in the housing 2. That surface 14 of said catalyst element that is formed to face the exhaust gas has a large number of ribs 15.

Figure 2:
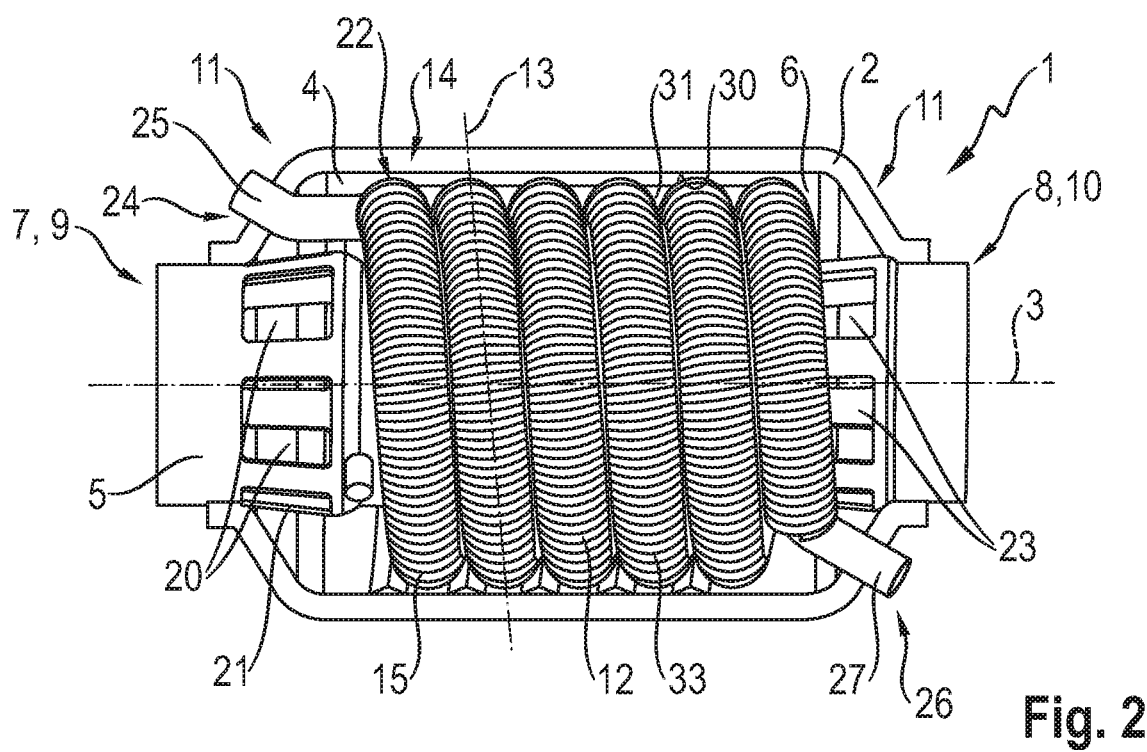
FIG. 2 shows a partial section through the catalytic converter according to FIG. 1.

FIGS. 1 and 2 respectively show a longitudinal section and a partial section through the catalytic converter 1 in its first operating state. The pipe 5 is closed with the aid of a regulating element 16, and no exhaust gas can flow into the interior 17 of the pipe 5 in the first operating state since a flow cross section 19 of the pipe 5 is closed by the regulating element 16.

The regulating element 16 is a disk mounted pivotably in the pipe 5 and can be pivoted about its center axis 18, preferably similar to a throttle valve.

Exhaust gas that enters the catalytic converter 1 via the inlet opening 7, flows into the annular channel 6 via recesses 20 when the regulating element 16 has closed the interior 17 of the pipe 5 in the flow direction.

The recesses 20 are formed between the inlet opening 7 and the regulating element 16 in the axial direction so that the exhaust gas (which also may be called the exhaust gas mass flow) can flow into the annular channel 6 via the inlet opening 7 when the flow cross section 19 is closed. For the purpose of simple production of the pipe 5, the recesses 20 are separated from one another merely by thin webs 21, so that the exhaust gas can enter the annular channel 6 in a relatively problem-free manner. In one exemplary embodiment, the webs 21 have a flow-optimized, teardrop-shaped cross section.

The exhaust gas flows around the catalyst element 12 that is arranged in the annular channel 6. An active surface 22 of the catalyst element 12 is increased in size in an installation-space-optimized manner relative to its surface 14 with the aid of the large number of ribs 15. The active surface 22 is the surface of the catalyst element 12 around which the exhaust gas flows and is larger than the surface 14 due to the large number of ribs 15. More particularly, the large number of ribs 15 are arranged on the surface 14 and the active surface 22 is formed with the large number of ribs 15. The active surface 22 is equipped with a catalytic layer 33.

The exhaust gas flows in the direction of the longitudinal axis 3 from the inlet opening 7 to the outlet opening 8. The exhaust gas that reaches the end of the annular channel 6 is purified on account of the flow of fluid around the catalyst element 12. The exhaust gas then flows out of the annular channel 6 in the radial direction into the pipe interior 17 via further recesses 23, and from there flows farther in the axial direction into the outlet opening 8.

In addition to the axial flow of fluid through the catalyst element 12 that takes place along the longitudinal axis 3, fluid can flow through the catalyst element in the direction of its element axis 13. More particularly, the catalyst element 12 is formed in a hollow manner so that fluid can flow through it. The fluid is, by way of example, a gaseous medium that functions to cool or warm the exhaust gas, depending on an operating range of the internal combustion engine. The fluid could likewise also be a liquid medium. The flow of fluid through the catalyst element 12, and the action of the fluid on the catalyst element 12 is regulated depending on operating points of the internal combustion engine. Therefore, the flow of fluid through the catalyst element 12 can be actively created.

To accommodate the fluid flow, the catalyst element 12 has a first fluid connection 25 at its first element end 24, which is formed in the region of the first end 9, and has a second fluid connection 27 at its second element end 26, which is opposite the first element end 24. Therefore, fluid can flow through the catalyst element from its first element end 24 to its second element end 26 and vice versa.

Figure 3:
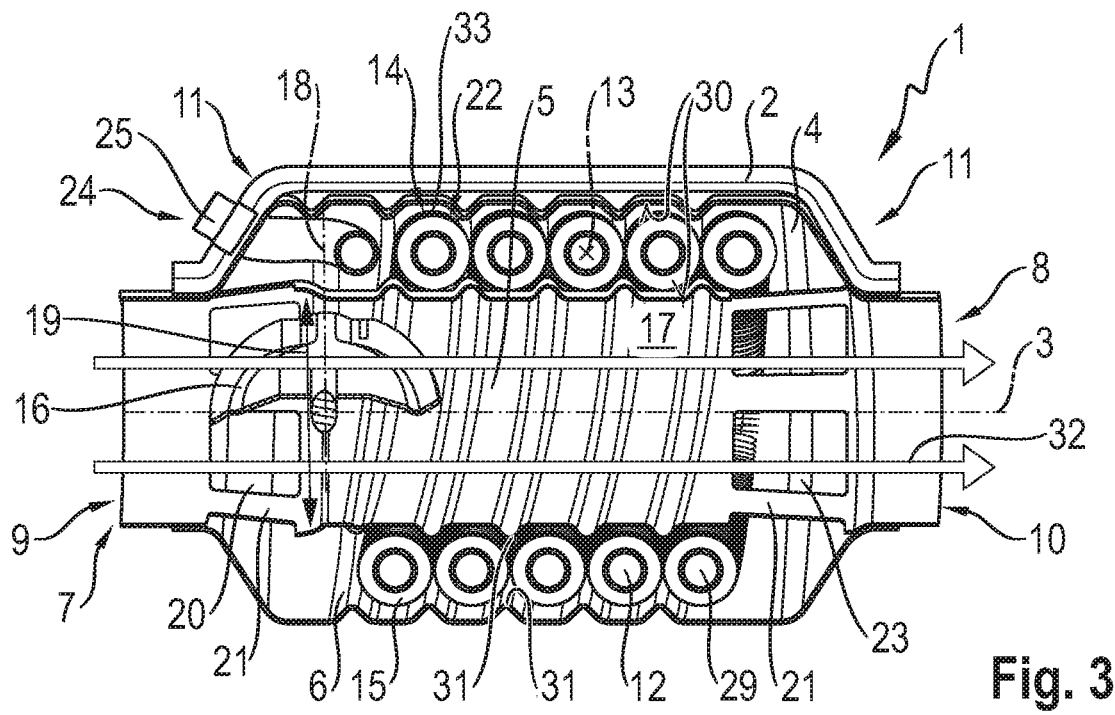
FIG. 3 shows a longitudinal section through the catalytic converter according to the invention in a second operating state.
Figure 4:
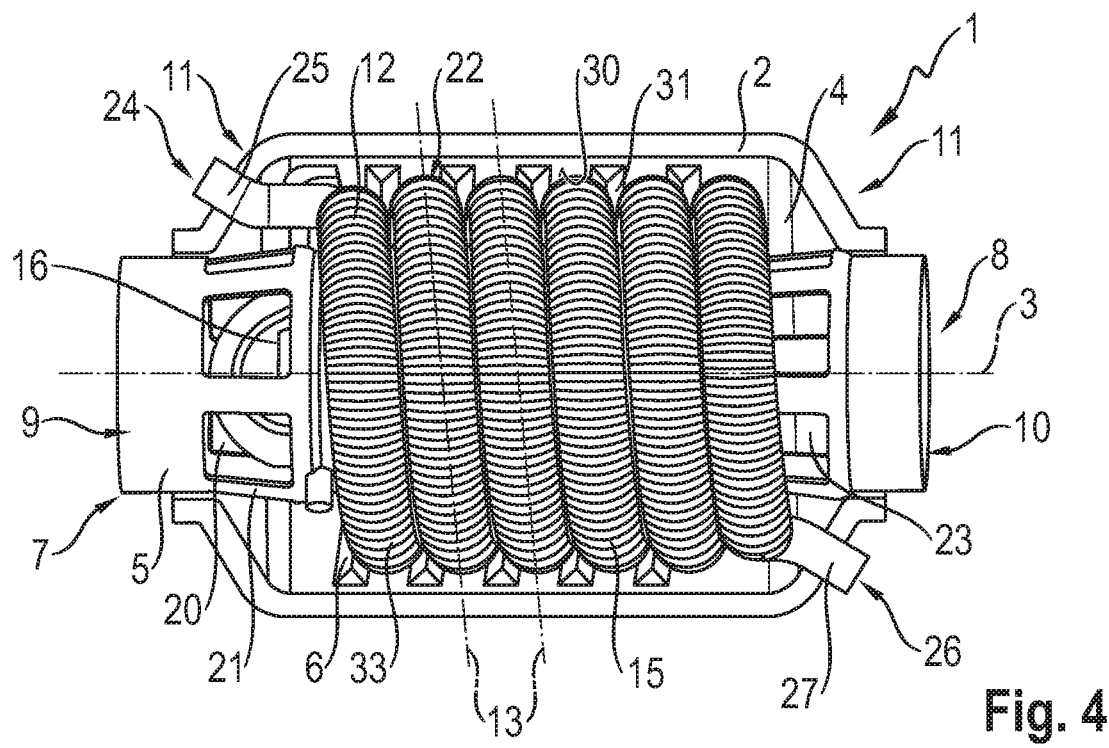
FIG. 4 shows a partial section through the catalytic converter according to FIG. 3.

FIGS. 3 and 4 respectively show a longitudinal section and a partial section through the catalytic converter 1 in its second operating state. Here, the flow cross section 19 is cleared by the regulating element 16 so that the exhaust gas can flow into the pipe interior 17. This means that the exhaust gas does not flow or flows only to an insignificant extent into the annular channel 6 via the recesses 20 and therefore circumvents or bypasses the catalyst element 12.

For the purpose of secured positioning of the catalyst element 12, the pipe 5 and the housing 2 have latching elevations 31 on their surfaces 30 that face the catalyst element 12. The latching elevations 31 are in the form of a helix and hold the catalyst element 12 in a secured manner between the latching elevations 31.

Figure 5:
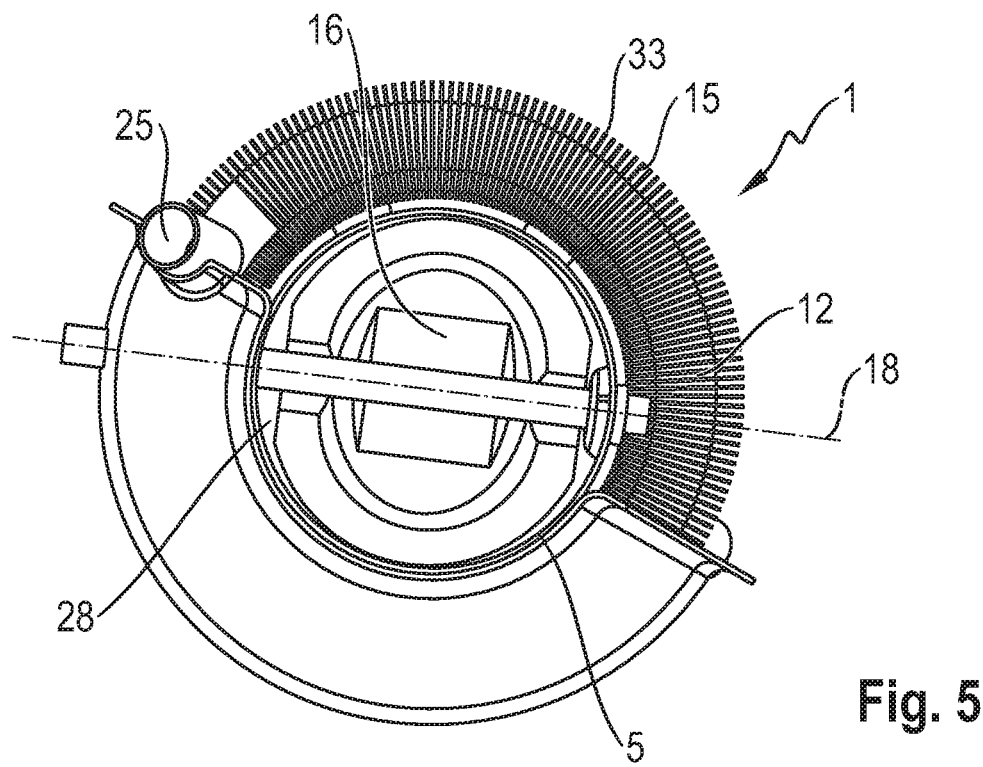
FIG. 5 shows a front view of the catalytic converter in its first operating state.
Figure 6:
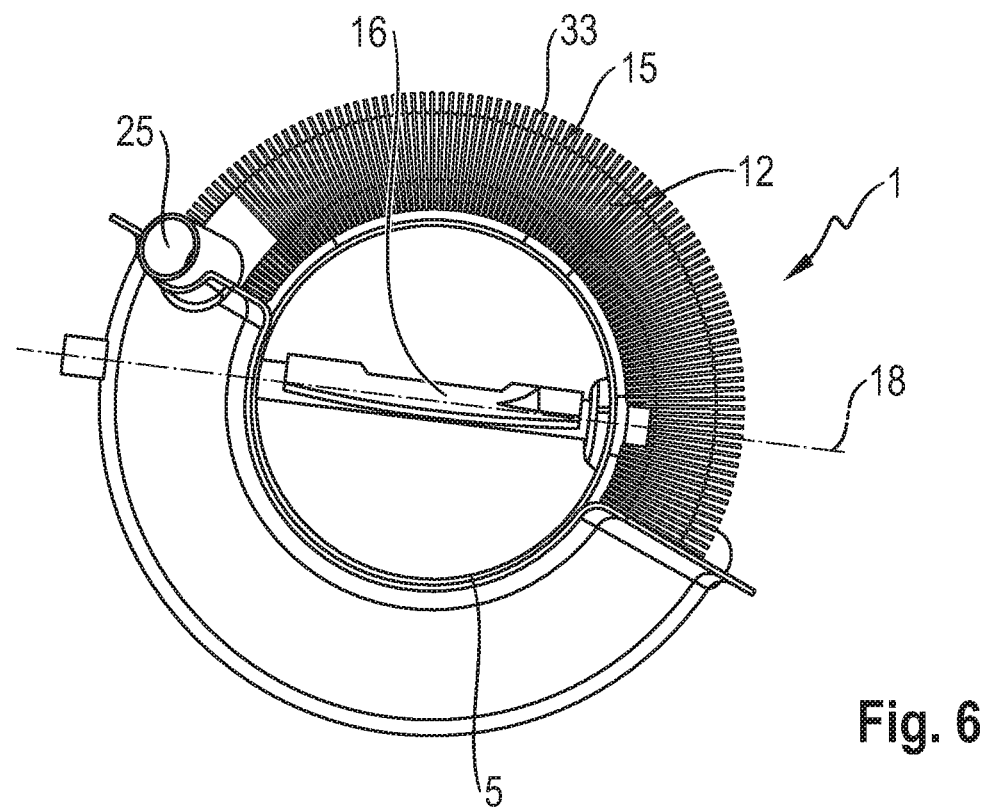
FIG. 6 shows a front view of the catalytic converter in its second operating state.

FIGS. 5 and 6 are front views of the catalytic converter 1 for improved explanation of the regulating element 16. FIG. 5 depicts the catalytic converter 1 in its first operating state, so that a flow cross section 19 is closed by the regulating element 16. The regulating element 16 is a throttle valve positioned in the flow cross section 19 with a movement gap 28 dimensioned so that the quantity of exhaust gas that flows across the movement gap 28 in the first operating state is negligible.

FIG. 6 shows the catalytic converter 1 in its second operating state with the regulating element 16 set to clear the flow cross section 19. The disk-like shaped regulating element 16 forms an only low flow resistance in the second operating state of the catalytic converter 1.

In a third operating state of the catalytic converter 1, not illustrated in any detail, the regulating element 16 is adjusted for fluid to flow through the annular channel 6 and the pipe interior 17.

The catalytic converter 1 of the invention is provided for warming up the exhaust gas and for cooling the catalyst element 12. In operating states of the internal combustion engine in which the exhaust gas is relatively cold, for example during cold-starting operation or during a warm-up phase of the internal combustion engine, the catalytic converter 1 is adjusted to its first operating state.

The exhaust gas then flows in the direction of the flow arrow 32, as shown in FIG. 1, via the inlet opening 7 and the recesses 20 formed in a radial manner in the pipe 5, into the annular channel 6 in which it is forcibly guided with the aid of the catalyst element 12 and flows through intermediate spaces that are formed with the large number of ribs 15. For the purpose of warming up the exhaust gas and therefore for the purpose of enhancing the catalytic effect of the catalyst element 12, a hot fluid, for example a hot gas from an auxiliary heater, flows through the catalyst element 12. This can be performed at the same time as the internal combustion engine is started or even before the internal combustion engine is started. This has the advantage that the catalytic layer 33 is heated by the warm fluid starting from the element interior 29.

At the time at which the internal combustion engine is started and thereafter, additional heating of the catalytic layer 33 takes place due to the exhaust gas that flows around it. Therefore, a usually existing time period from the point at which the internal combustion engine is started to the point at which the minimum operating temperature of the catalytic converter 1 is reached is shortened.

Provided that hot fluid is already flowing through the catalytic converter 1 before the internal combustion engine is started, it is possible for the catalytic converter 1 to reach its minimum operating temperature before the internal combustion engine is started. The advantage is that effective exhaust gas purification can already take place when the internal combustion engine is started.

Even the flow of hot fluid through the catalyst element 12 at the same time as the internal combustion engine is started results in a time period between starting and the point at which the minimum operating temperature of the catalytic converter 1 is reached which is substantially shortened in comparison to the prior art.

Cold fluid may flow through the catalyst element 12 at operating points of the internal combustion engine at which a high to maximum exhaust gas temperature of the internal combustion engine is reached. Operating points of this kind are full-load points of the internal combustion engine and operating points in the upper load and rotation speed ranges. In this case, the catalytic converter 1 is at its second operating point and the exhaust gas flows completely, according to the arrows 32 of FIG. 3, through the pipe interior 17. Thus, the exhaust gas completely or virtually completely bypasses the annular channel 6 and the catalyst element 12. The flow of cold fluid through the catalyst element 12 prevents thermal overloading of the catalytic layer 33 of the catalyst element 12 that usually occurs at exhaust gas temperatures of above 850°. Therefore, heat can be drawn from the catalytic layer 33 and discharged by the fluid that flows through the catalyst element 12.

What is claimed is:

1. A catalytic converter for an internal combustion engine, comprising:
   a housing having opposite first and second ends;
   a pipe passing through the housing, the pipe having opposite first and second end portions, the first end portion of the pipe being disposed to receive exhaust gas of the internal combustion engine and being secured to the first end of the housing, the second end portion of the pipe being secured to the second end of the housing, an annular channel being defined between the pipe and the housing, first recesses passing through the pipe and communicating with the annular channel at a location in proximity to the first end of the housing and second recesses extending through the pipe and communicating with the annular channel at a location in proximity to the second end of the housing; and
   a catalyst element wound around parts of the pipe in the annular channel, wherein
   the catalyst element is a ribbed tube formed such that fluid can flow around and through the catalyst element, and a surface of the ribbed tube of the catalyst element that faces the exhaust gas has a plurality of ribs on which a catalytic layer is provided.

2. The catalytic converter of claim 1, wherein the pipe enables at least part of the exhaust gas to circumvent the catalyst element.

3. The catalytic converter of claim 2, wherein the catalyst element has a helical configuration.

4. The catalytic converter of claim 3, wherein latching elevations are formed on surfaces of at least one of the pipe and the housing that face the catalyst element.

5. The catalytic converter of claim 3, further comprising a regulating element that regulates fluid flow through the annular channel and along the plurality of ribs.

6. The catalytic converter of claim 5, wherein the regulating element is a disk that can be pivoted about an axis passing through a diameter of the disk.

7. The catalytic converter of claim 2, further comprising a regulating element that opens and closes a flow cross section of the pipe, and wherein the first recesses are formed upstream of the regulating element and are configured to accommodate a fluid flow into the annular channel.

8. The catalytic converter of claim 7, wherein the second recesses are downstream of the regulating element and upstream of the second end of the pipe to accommodate a fluid flow direction from the annular channel to the second end of the pipe.

9. The catalytic converter of claim 1, wherein the catalyst element comprises a ribbed pipe.

10. The catalytic converter of claim 1, wherein the catalyst element has an active surface defined by a catalytic coating.

* * * * *